United States Patent
Lasser

(10) Patent No.: US 6,591,330 B2
(45) Date of Patent: Jul. 8, 2003

(54) SYSTEM AND METHOD FOR FLEXIBLE FLASH FILE

(75) Inventor: Menahem Lasser, Kohav-Yair (IL)

(73) Assignee: M-Systems Flash Disk Pioneers Ltd., Kfar Saba (IL)

( * ) Notice: Subject to any disclaimer, the term of this patent is extended or adjusted under 35 U.S.C. 154(b) by 218 days.

(21) Appl. No.: 09/882,056

(22) Filed: Jun. 18, 2001

(65) Prior Publication Data

US 2002/0194438 A1 Dec. 19, 2002

(51) Int. Cl.$^7$ .......................... G06F 12/00; G06F 13/00; G11C 16/02
(52) U.S. Cl. .................... 711/103; 711/5; 711/202; 365/185.11; 365/185.29; 365/185.33
(58) Field of Search ........................... 711/103, 5, 202, 711/203; 365/185.11, 185.29, 185.33

(56) References Cited

U.S. PATENT DOCUMENTS

| | | | |
|---|---|---|---|
| 5,404,485 A | | 4/1995 | Ban .......................... 711/202 |
| 5,796,657 A | * | 8/1998 | Lee et al. ............... 365/185.11 |
| 5,847,999 A | * | 12/1998 | Kwon .................... 365/185.33 |
| 5,937,425 A | | 8/1999 | Ban ............................ 711/103 |
| 5,991,196 A | * | 11/1999 | Thomsen et al. ....... 365/185.11 |
| 6,400,603 B1 | * | 6/2002 | Blyth et al. ............ 365/185.33 |

* cited by examiner

*Primary Examiner*—Glenn Gossage
(74) *Attorney, Agent, or Firm*—Mark M. Friedman

(57) ABSTRACT

A system and method for more flexibly managing flash memory devices, such that these devices can be more efficiently used to store data as flash disks. The present invention provides an improvement by enabling erase units of different sizes to be erased. Preferably, the present invention is also operative with flash memory devices which are capable of erasing the memory in a plurality of different erase unit sizes, and more preferably, is able to select the most efficient erase unit size for erasing. The present invention is able to optionally and more preferably use a plurality of different decision rules in order to select the most efficient method for erasing and/or reading/writing data to the flash memory device. Most preferably, the present invention is able to detect the capabilities of the flash memory device, in order to be automatically operative with a plurality of different types of flash memory technologies.

41 Claims, 1 Drawing Sheet

SYSTEM AND METHOD FOR FLEXIBLE FLASH FILE

FIELD OF THE INVENTION

The present invention relates to a system and method for handling data storage on a plurality of different types of flash devices and, in particular, to a system and method which manage the storage and retrieval of information on flash devices having different sizes of erasable units and/or read/write units, enabling them to behave as flash disks.

BACKGROUND OF THE INVENTION

Flash devices include electrically erasable and programmable read-only memories (EEPROMs) made of flash-type, floating-gate transistors and are non-volatile memories similar in functionality and performance to EPROM memories, with an additional functionality that allows an in-circuit, programmable, operation to erase portions of the memory. Flash devices have the advantage of being relatively inexpensive and requiring relatively little power as compared to traditional magnetic storage disks. However, in a flash device, it is not practical to rewrite a previously written area of the memory without a preceding erase of the area. This limitation of flash devices causes them to be incompatible with typical existing operating system programs, since data cannot be written to an area of memory within the flash device in which data has previously been written, unless the area is first erased.

Software products have been proposed in the background art to allow a flash device to be managed by existing computer operating programs without modification of the operating system program. However, these background art programs all have deficiencies. For example, one program operates the flash memory as a "write once read many" device. This background art software product cannot recycle previously written memory locations. When all locations are eventually written the memory cannot be further used without specific user intervention. To overcome these deficiencies of the background art, a flash File System (FFS) was disclosed in U.S. Pat. No. 5,404,485, which is owned in common with the present application and which is hereby incorporated by reference as if fully set forth herein. FFS provided a system of data storage and manipulation on flash devices which allowed these devices to emulate magnetic disks. As noted above, the relatively inexpensive cost and low power consumption of flash devices makes them a favorable choice for data storage, particularly for laptop, portable computers. FFS enhances the ability of flash devices to act as substitutes for magnetic disk storage. Indeed, FFS as disclosed in U.S. Pat. No. 5,404,485 has proven to be so useful that the data layout specification was adopted by the PCMCIA (Personal Computer Memory Card International Association) and JEIDA (Japan Electronic Industry Development Association) committees as a standard called Flash Translation Layer (FTL).

FFS essentially describes a virtual mapping system for flash EEPROM devices. The virtual map is a table which relates the physical address of a read/write block within the flash device to the virtual address of that block. Since each of these blocks is relatively small, 512 bytes, the size of the virtual map itself is quite large. FFS also includes a method of storing and maintaining the bulk of the virtual map on a flash EEPROM device, minimizing the amount of other memory required for storage of the virtual map.

As noted above, FFS has proven particularly successful for transforming flash devices into emulators of magnetic disk storage, so much so that it has been adopted as an industry standard. However, FFS cannot fulfill all of the requirements of the newer flash device technologies. In particular, FFS is not as successful with the NAND and AND flash technologies. Therefore, U.S. Pat. No. 5,937,425, which is owned in common with the present application and which is hereby incorporated by reference as if fully set forth herein, describes an additional implementation of the flash file system for these technologies. However, both of these implementations are useful mainly for specific types of technologies for flash memories.

For example, some new flash memory devices enable the operating software to select the exact size of the memory portion that is erased in a single erase operation. Traditional flash devices have a single size of an erase zone, which defined the chunk of data that could be erased in a single erase operation. This size was typically in the tens of kilobytes range. There are now flash devices which have more than one such erase zone size. For example, the SST34HF162X and SST34HF164X Concurrent SuperFlash devices from Silicon Storage Technology Inc. provide for erasing either 1 KWords sectors or 32 KWords blocks. Also, the NROM flash technology being developed by Saifun Semiconductors Ltd. also has this capability of being able to select the size of the erased portion from a group of two allowable sizes. This extra freedom of choice can be utilized for improving the background art methods.

SUMMARY OF THE INVENTION

The background art does not teach or suggest a mechanism for managing flash data on a plurality of different types of flash memory technologies. In addition, the background art does not teach or suggest such a mechanism which is highly flexible and which is able to operate more efficiently with these different types of technologies.

The present invention overcomes these deficiencies of the background art by providing a memory organization method which is suitable for different types of flash memory technologies.

Hereinafter, the term "physical unit" is defined as a unit on the physical media or hardware of the memory which is the smallest portion of the memory which can be erased or an integral multiple thereof. It is a portion of the memory which is contiguous, fixed in size and erasable. The term "physical block" is defined as being the portion of the memory for reading or writing data.

Hereinafter, the term "virtual unit" is defined as the same size as the physical unit.

Hereinafter, the term "virtual map" refers to a table which relates a virtual unit to at least one corresponding physical unit. As noted previously, each unit, virtual or physical, is composed of a plurality of blocks. The exact location of a block within a unit is determined according to one or more preset rules, as further described below.

Each physical unit is designated by a physical unit number. The location of each physical block is given by a physical block offset. Similarly, each virtual unit is designated by a virtual unit number. The location of each virtual block is given by a virtual block offset. It should be noted that each virtual unit number can correspond to one or more physical unit numbers. Thus, the mapping between virtual units and physical units can either be one-to-one or one-to-many.

Hereinafter, the term "writing data" describes the act of storing data on the flash memory. The term "reading data" describes the act of retrieving data from the flash memory.

Hereinafter, the term "unwritten" indicates some portion of the memory, such as a physical block, which is capable of having data written to it. Thus, the term "unwritten" includes, but is not limited to, a portion of the memory which has just been erased.

In a computer or other electronic device having a flash memory organized according to the present invention, the operating system of that device interacts with the virtual units and virtual blocks for reading and writing data. The virtual media, which includes the virtual units and blocks, thus acts as an interface for the operating system to interact with the flash memory device. For example, the operating system issues a write command to write data to a virtual block at a virtual block offset. The virtual unit containing the virtual block is then located. The virtual map then locates a corresponding physical block within a physical unit of the memory, where the data are actually stored. Although the operating system issues read and write commands as though the virtual units and virtual blocks are the actual hardware of the flash memory, in reality the actual hardware is incorporated in the physical units and physical blocks of the flash memory. Thus, the operating system is only aware of the virtual units and blocks, and does not directly interact with the hardware itself.

The advantage of such an interface is that the inherent disadvantages of the flash memory, such as the requirement for an erase before further writing can occur, are overcome by the interactions of the operating system with the virtual memory. Additionally, the operating system of the electronic device does not have to organize the addresses of the flash memory. Furthermore, the operating system can interact with a variety of different flash memory technologies without requiring extensive modifications, since one interface can be used with multiple types of flash memory devices. Thus, the methods of the present invention permit the greatest flexibility for flash memory devices and the electronic devices which use them.

According to the present invention, there is provided a memory organization method for a memory in which data can only be written to an unwritten portion of the memory, such that a written portion of the memory must be erased to become unwritten, the memory having a plurality of memory portions for reading or writing data, each of the plurality of memory portions for reading or writing data having a size, the method comprising: providing a size of a memory portion of the memory for being erasable in one operation, wherein the size of the memory portion for erasing is selectable from a group of sizes which contains at least one size equal to the size of the memory portion for reading or writing data and which also contains at least one size being different from the size of the memory portion for reading or writing data; providing a plurality of physical units of the memory, each of the physical units being designated by a physical unit number and each of the physical units being divided into a plurality of physical blocks, each of the plurality of physical blocks being the size of the memory portion for reading or writing data and each of the physical blocks being designated by a physical block offset within the physical unit, wherein a size of the physical unit is either equal in size to one of the selectable erase sizes but not to the size of the memory portion for reading or writing, or alternatively is equal to an integral multiple of one of the selectable erase sizes, providing a plurality of virtual units of the memory, each virtual unit being designated by a virtual unit number and each of the virtual units featuring a plurality of virtual blocks being designated by a virtual block offset within the virtual unit; mapping each virtual unit to at least one physical unit to form a virtual map; and mapping each virtual block within the virtual unit to one physical block within the at least one physical unit.

According to another embodiment of the present invention, there is provided a memory organization method for a memory in which data can only be written to an unwritten portion of the memory, such that a written portion of the memory must be erased to become unwritten, and in which the size of the memory portion that can be erased in one operation differs from the size of the memory portion for reading or writing data, the method comprising: providing a plurality of physical units of the memory, each of the physical units having a size equal to an integral multiple of the smallest memory portion for erasing, each of the physical units being designated by a physical unit number and each of the physical units being divided into a plurality of physical blocks, each of the plurality of physical blocks being the size of the memory portion for reading or writing data and each of the physical blocks being designated by a physical block offset within the physical unit; providing a plurality of virtual units of the memory, each virtual unit being designated by a virtual unit number and each of the virtual units featuring a plurality of virtual blocks being designated by a virtual block offset within the virtual unit; mapping each virtual unit to at least one physical unit to form a virtual map; and mapping each virtual block within the virtual unit to one physical block within the at least one physical unit according to the virtual map.

According to still another embodiment of the present invention, there is provided a memory organization method for a memory in which data can only be written to an unwritten portion of the memory, such that a written portion of the memory must be erased to become unwritten, and in which the size of the memory portion that can be erased in one operation is selectable from a group of sizes which contains at least one size equal to the size of the memory portion for reading or writing data and which also contains at least one size larger than the size of the memory portion for reading or writing data, the method comprising: providing a plurality of physical units of the memory, each of the physical units being either equal in size to one of the selectable erase sizes but not to the size of the memory portion for reading or writing or equal to an integral multiple of any of the selectable erase sizes, each of the physical units being designated by a physical unit number and each of the physical units being divided into a plurality of physical blocks, each of the plurality of physical blocks being the size of the memory portion for reading or writing data and each of the physical blocks being designated by a physical block offset within the physical unit; providing a plurality of virtual units of the memory, each virtual unit being designated by a virtual unit number and each of the virtual units featuring a plurality of virtual blocks being designated by a virtual block offset within the virtual unit; mapping each virtual unit to at least one physical unit to form a virtual map; and mapping each virtual block within the virtual unit to one physical block within the at least one physical unit.

According to yet another embodiment of the present invention, there is provided a memory management method for a memory in which data can be written only in unwritten physical memory locations and in which a zone of contiguous memory locations can be simultaneously erased, comprising the steps of: organizing the memory into a plurality of units; organizing each unit into a plurality of blocks, each of the blocks made up of a plurality of contiguous physical memory locations; establishing an allocation map for each unit which indicates the status of each block in the unit as written, unwritten or deleted; establishing a virtual map to map virtual addresses to physical addresses; in writing data to the memory at a virtual address: mapping the virtual address to a physical address using the virtual map; examining the allocation map for the physical unit into which the virtual address has been mapped to determine the status of the physical block into which the virtual address has been mapped as written, unwritten or deleted; if the physical block is in written or deleted status, selecting one of the following two procedures: a first procedure, comprising: examining the allocation map for at least one of the units to identify an unwritten physical block; writing the data into the memory to the unwritten physical block; changing the allocation map for the unit into which the data have been written to indicate as written the previously unwritten block where the data have been written; changing the virtual map so that the virtual map maps the virtual address to the physical address of the previously unwritten block in which the data have been written; and a second procedure, comprising: erasing the physical block into which the virtual address has been mapped; writing the data into the physical block; if the physical block was previously marked as deleted in the unit allocation map, changing the allocation map for the unit into which the data have been written to indicate as written the previously deleted block where the data have been written.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
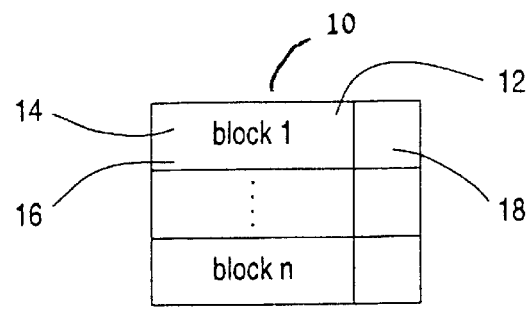
FIG. 1 is a schematic diagram of a physical flash memory device according to the present invention.

The present invention is of a system and method for more flexibly managing flash memory devices, such that these devices can be more efficiently used to store data as flash disks. The present invention provides an improvement over background art methods by enabling erase units of different sizes to be erased. Preferably, the present invention is also operative with flash memory devices which are capable of erasing the memory in a plurality of different erase unit sizes, and more preferably, is able to select the most efficient erase unit size for erasing. The present invention is able to optionally and more preferably use a plurality of different decision rules in order to select the most efficient method for erasing and/or reading/writing data to the flash memory device. Most preferably, the present invention is able to detect the capabilities of the flash memory device, in order to be automatically operative with a plurality of different types of flash memory technologies.

Optionally and preferably, the present invention is operative with physical units which are larger in size than any erase zone of the device. Such a feature is highly preferred since flash devices have increasingly higher capacities, while erase units often stay the same size. If the physical units are always the size of the erase zones, the number of units per device increases. This in turn increases the size of the mapping tables required for the virtual to physical address translation, which consequently increases the computer memory footprint of the software device driver required for supporting said flash devices. By allowing physical units to be an integral number of the size of the largest erase units, the number of units per device is decreased. This in turn decreases the size of the mapping tables, which consequently decreases the computer memory footprint of the software device driver.

For the preferred embodiment of the present invention which uses decision rules, preferably a decision point is reached when new data has to be written into a block which is already written or was written and later deleted. At this point a decision rule is optionally and preferably introduced, making a decision between the procedure employed by the original method, which always allocates unwritten memory space to write into, and between the additional procedure which implements a "write in place" strategy.

The decision rule employed can be any rule of any kind. Examples for such rules (the list provided just for the sake of clarification, without imposing any limit on the type and generality of rules that can be employed) include but are not limited to, the following rules. One decision rule is optionally dependent on whether the selection of the first procedure which requires the allocation of some unwritten portion of memory, is possible without having first to recycle some portion of memory. This may be a useful rule, as it can be used to minimize the number of such recycling operations.

Another such rule may be dependent on the number of data blocks within the same physical vicinity in flash memory having to be written at substantially the same time. This may be a useful rule, as the overhead associated with a larger size erase operation may be thus shared between several block write operations, all utilizing the same recycled area and thus making the first procedure shorter than the second one.

Yet another decision rule may be dependent on the time required to erase a physical block and/or the time required to erase a physical unit. This may be a useful rule, as the main consideration for selecting an optimal solution is based on timing performance.

Still another decision rule may be dependent on the value of the data to be written. This may be a useful rule, as in some flash devices the time required to write data into the flash varies with the value of the data (i.e. depending on the number of "1" bits vs. the number of "0" bits).

Another decision rule may be dependent on the physical address in which the data is to be written, such that the physical device is divided into separate sections, each employing a different writing policy. Alternatively, the decision rule may operate according to the virtual address in which the data is to be written, thereby allowing the virtual device to be divided into separate sections, each employing a different writing policy.

Still another decision rule is dependent on a random value for determining invocation, thereby allowing the creation of mixed policies in which the relative probabilities of selecting each of the two procedures supports a balance between the benefits of both procedures.

A variation on this decision rule would provide a deterministic mixture of selected procedures, such that a fixed percentage of a total number of selections would be one of the two procedures. This variation also provides for a mixture of policies, but according to predetermined fixed ratio.

Another decision rule operates according to the value of a counter associated with each physical block, which counts the number of times said physical block was erased. In some flash devices the number of times a small erase chunk can be erased before having to erase the enclosing larger erase chunk is limited, a situation which is handled by this rule.

Simple decision rules may also be invoked to force a particular decision to be used at all times, for example when the flash memory technology of the device is itself limited to particular types of operations.

While this invention will be described in the context of a flash memory, those skilled in the art will understand that its teachings are also applicable to data storage devices with the same write, read, and unit erase characteristics as flash memories.

The principles and operation of a system and method according to the present invention may be better understood with reference to the drawings and the accompanying description.

Referring now to the drawings, FIG. 1 schematically illustrates a background art physical page-mode flash memory device according to a technology such as NAND, for example. The term "physical device" is hereinafter defined as the actual hardware itself which contains the physical media for the flash memory device. Such physical media is typically composed of flash EEPROM units, although any suitable non-volatile, programmable memory device could be substituted. The term "programmable" is hereinafter defined as alterable, such as by having data written to the memory device, for example.

A flash memory physical device 10 is shown, with at least one physical unit 12. Physical unit 12 is the smallest segment of physical device 10 which can be erased, or an integral multiple thereof Physical unit 12 includes an integral number of blocks, individually designated as blocks I to n, where n is an integer, and collectively designated as block 14. Block 14 is composed of a contiguous, fixed-length group of physical byte addresses and is a feature of the hardware. Specifically, the size of block 14 is a characteristic of physical device 10. User data can be stored in a primary data area 16 of block 14. Each block 14 also has a control data area 18. Control data area 18 is addressable by a separate algorithm from the main portion of block 14 and is not included in calculations of the size of block 14. As further described below, control data area 18 is convenient for the storage of information related to the flash filing system itself. Each physical unit 12 is either an assigned unit or an unassigned unit. Each unassigned unit is free, contains no useful data and is ready to be allocated and assigned. Each assigned unit has been allocated and contains data.

Figure 2:
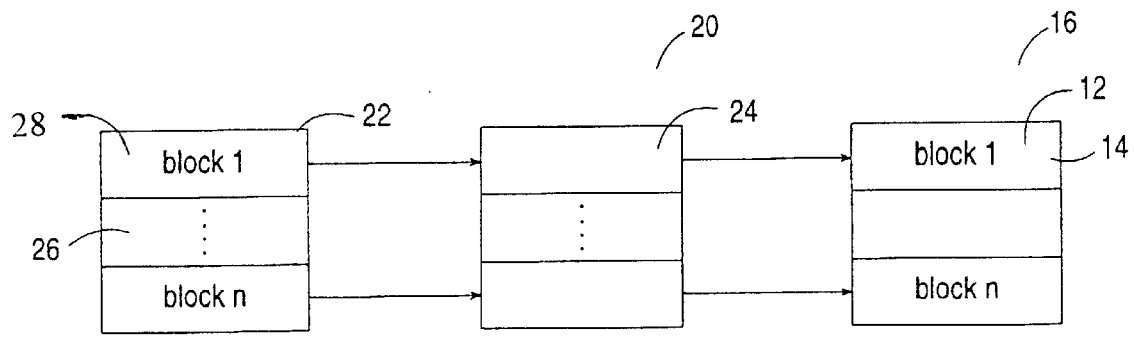
FIG. 2 is a diagram of a basic system of organizing the flash memory device according to the present invention.

FIG. 2 illustrates a system for organizing a basic flash memory device. A system 20 controls both a virtual media 22 and physical device 10, and relates virtual media 22 to physical device 10 through a virtual map 24. Virtual media 22 includes a plurality of virtual units 26. Each virtual unit 26 has a plurality of virtual blocks 28. Each virtual unit 26 is designated by a virtual address. The virtual address includes a virtual unit number, designating a particular virtual unit 26. Each virtual block 28 is designated by a virtual block offset. Similarly, each physical unit 12 has a physical address. The physical address includes a physical unit number, designating a particular physical unit 12. Each physical block 14 has a physical block offset.

Virtual map 24 maps virtual unit 26, which is an assigned virtual unit, to at least one physical unit 12, which is an assigned physical unit. As for the physical units, if a virtual unit has been mapped to at least one physical unit, it is an assigned virtual unit. However, one virtual unit 26 can be mapped to more than one physical unit 12. Thus, the correspondence between virtual unit 26 and physical unit 12 can be either one-to-one or one-to-many.

System 20 operates as follows. The operating system of an electronic device which contains a flash memory device (not shown) sends a command, such as a read command or a write command, to a particular virtual block 28 within a particular virtual unit 26. Virtual map 24 then locates the corresponding physical block 14 within a physical unit 12.

If the correspondence of the mapping is one-to-one as shown, with each virtual unit 26 being mapped to exactly one physical unit 12, then the situation would appear to be relatively simple. However, as noted above, physical device 10 has particular physical constraints for reading and writing data, including the requirement for performing periodic erasures before additional data can be written.

An exemplary method for mapping virtual addresses to physical addresses, for example for writing data to a flash device, such as physical device 10, can optionally be performed. As described with regard to FIG. 2, virtual map stores the mapping of each virtual unit to at least one physical unit. The flash device (or other type of memory) is assumed to have the feature that data can only be written to an unwritten portion of the memory, such that a portion of the memory which has been written must be erased before different data can be written to the memory. Furthermore, the memory is assumed to have a plurality of memory portions for reading or writing data, each of which has a particular size.

Optionally and preferably, the size of a memory portion which is erasable in one operation is determined. Such a size is inherent to the characteristics of the particular memory device, and in fact may optionally be a plurality of sizes, since the device may be capable of erasing portions in more than one size. Most preferably, the size of the erasable memory portion is detected, for example by detecting the type of memory device, or alternatively, by having this information provided by the operating system of the computer which is operating the memory device. In any case, the method of the present invention is able to handle such a plurality of different sizes of erasable portions. Such a plurality of different sizes includes at least one size equal to the size of the memory portion for reading or writing data and also at least one size which is different from the size of that memory portion for reading or writing data.

In addition, it should be noted that for the operation of the method of the present invention (and also as previously described), each physical unit of the memory is designated by a physical unit number and is also divided into a plurality of physical blocks. Each physical block is the size of the memory portion for reading or writing data and each physical block is designated by a physical block offset within the physical unit. The size of the physical unit is either equal in size to one of the erase sizes (sizes of the erasable memory portion) but not to the size of the memory portion for reading or writing, or alternatively is equal to an integral multiple of one of the erase sizes.

For the purposes of mapping, the plurality of virtual units of the memory are each designated by a virtual unit number. Each virtual unit features a plurality of virtual blocks, designated by a virtual block offset within the virtual unit. The actual mapping is performed by mapping each virtual unit to at least one physical unit to form a virtual map. Next, each virtual block is mapped within the virtual unit to one physical block within the at least one physical unit Next, a write command is optionally and preferably received to write data at a virtual block. Once such a command has been received, a virtual unit is located containing this virtual block. An unwritten block is located within a physical unit which is mapped to the virtual unit, and the data is written to the unwritten physical block.

If however, a physical block within a physical unit mapped to the virtual unit cannot be located, one of the following two procedures is optionally and more preferably selected. Preferably, the first procedure is performed by locating an unwritten additional physical unit, and then writing the data to an unwritten physical block of the additional unwritten physical unit. The virtual map is then updated by additionally mapping the virtual unit to the additional unwritten physical unit, such that the virtual unit corresponds to the additional unwritten physical unit and to the at least one written physical unit. Therefore, the additional unwritten physical unit and the written physical unit forming a chain of physical units.

Preferably, the second and alternative procedure is performed by locating a written physical block within a physical unit mapped to the virtual unit, with the virtual block being mapped to the physical block. Next, the physical block is erased. Next, the data is written to the physical block.

The selection may optionally be fixed, such that the first or second procedure is always selected. However, optionally and more preferably, the selection is dependent on a rule, such as for example whether the additional unwritten physical unit is locatable when selecting the first procedure, without having first to recycle some portion of memory. Alternatively or additionally, the selection is dependent on the number of virtual blocks within the same virtual unit being written substantially simultaneously. Also alternatively or additionally, the selection is dependent on at least one of a time required to erase a physical block and a time required to erase a physical unit.

Also alternatively or additionally, the selection is dependent on the data to be written. Also alternatively or additionally, the selection is dependent on a physical unit number in which the physical block resides. Also alternatively or additionally, the selection is dependent on a virtual unit number in which the virtual block resides. Also alternatively or additionally, the selection is dependent on a random value for providing a probabilistic ratio of selected procedures. A variation on this decision rule would provide a deterministic mixture of selected procedures, such that a fixed percentage of a total number of selections would be one of the two procedures. This variation also provides for a mixture of policies, but according to predetermined fixed ratio. Also alternatively or additionally, the method may further feature allocating a counter associated with each physical block, to count a number of times the physical block is erased. Next, if the second procedure is selected, the counter associated with the physical block to be written is incremented. Optionally and more preferably, the selection is dependent on the counter associated with the physical block.

Optionally and most preferably, the physical block within the physical unit has a physical block offset, and the physical block offset may be different than the virtual block offset of the mapped virtual block.

According to another preferred embodiment of the present invention, the method further features a procedure such that if the first procedure is selected and if an unwritten additional physical unit cannot be located, a second virtual unit corresponding to a plurality of physical units in a chain is located. Next, the last physical unit in the chain is located, and data is moved from each written physical block of each of the physical units of the chain, with the exception of the last physical unit, to a writable physical block of the last physical unit. Next, the virtual map is updated by mapping the virtual unit to the last physical unit, such that the virtual unit corresponds only to the last physical unit. All of the written physical units in the chain are erased, with the exception of the last physical unit.

According to an optional embodiment of the present invention, a transfer unit is provided for at least temporarily holding data when a physical unit is to be erased. The transfer unit is a physical unit which preferably does not have any data written to it, so that it can hold the data of another physical unit. The data of this latter physical unit is transferred to the transfer unit, and then the latter physical unit is erased. The transfer unit optionally and more preferably has an associated allocation map, which shows those blocks of the transfer unit that have been written.

It will be appreciated that the above descriptions are intended only to serve as examples, and that many other embodiments are possible within the spirit and the scope of the present invention.

What is claimed is:

1. A memory organization method for a memory in which data can only be written to an unwritten portion of the memory, such that a written portion of the memory must be erased to become unwritten, the memory having a plurality of memory portions for reading or writing data, each of the plurality of memory portions for reading or writing data having a size, the method comprising:

providing a size of a memory portion of the memory for being erasable in one operation, wherein said size of the memory portion for erasing is selectable from a group of sizes which contains at least one size equal to the size of the memory portion for reading or writing data and which also contains at least one size being different from the size of the memory portion for reading or writing data;

providing a plurality of physical units of the memory, each of said physical units being designated by a physical unit number and each of said physical units being divided into a plurality of physical blocks, each of said plurality of physical blocks being the size of the memory portion for reading or writing data and each of said physical blocks being designated by a physical block offset within said physical unit, wherein a size of said physical unit is either equal in size to one of said selectable erase sizes but not to the size of the memory portion for reading or writing, or alternatively is equal to an integral multiple of one of said selectable erase sizes, providing a plurality of virtual units of the memory, each virtual unit being designated by a virtual unit number and each of said virtual units featuring a plurality of virtual blocks being designated by a virtual block offset within said virtual unit;

mapping each virtual unit to at least one physical unit to form a virtual map; and mapping each virtual block within said virtual unit to one physical block within said at least one physical unit.

2. The method of claim 1, further comprising:

receiving a write command to write data at a virtual block;

locating a virtual unit containing said virtual block;

locating an unwritten block within a physical unit mapped to said virtual unit; and writing said data to said unwritten physical block.

3. The method of claim 2, further comprising the steps of:

if an unwritten physical block within a physical unit mapped to said virtual unit cannot be located for mapping said virtual block to said physical block, selecting one of the following two procedures:

a first procedure, comprising:
  locating an unwritten additional physical unit;
  writing said data to an unwritten physical block of said additional unwritten physical unit; and
  updating said virtual map by additionally mapping said virtual unit to said additional unwritten physical unit, such that said virtual unit corresponds to said additional unwritten physical unit and to said at least one written physical unit, said additional unwritten physical unit and said at least one written physical unit forming a chain of physical units; and
a second procedure, comprising:
  locating a written physical block within a physical unit mapped to said virtual unit with said virtual block being mapped to said physical block;
  erasing said physical block; and
  writing said data to said physical block.

4. The method of claim 3, wherein said first procedure is always selected.

5. The method of claim 3, wherein said second procedure is always selected.

6. The method of claim 3, wherein said selection is dependent on whether said additional unwritten physical unit is locatable when selecting said first procedure.

7. The method of claim 3, wherein said selection is dependent on a number of said virtual blocks within the same said virtual unit for being written substantially simultaneously.

8. The method of claim 3, wherein said selection is dependent on at least one of a time required to erase a physical block and a time required to erase a physical unit.

9. The method of claim 3, wherein said selection is dependent on said data to be written.

10. The method of claim 3, wherein said selection is dependent on a physical unit number in which said physical block resides.

11. The method of claim 3, wherein said selection is dependent on a virtual unit number in which said virtual block resides.

12. The method of claim 3, wherein said selection is dependent on a random value.

13. The method of claim 3, wherein each of said first and second procedures is selected a fixed percentage of total selections.

14. The method of claim 3, further comprising:
  allocating a counter associated with each physical block, to count a number of times said physical block is erased; and
  if said second procedure is selected, incrementing said counter associated with said physical block to be written.

15. The method of claim 13, wherein said selection is dependent on said counter associated with said physical block.

16. The method of claim 1, wherein said physical block within said at least one physical unit has a physical block offset, and said physical block offset is always equal to said virtual block offset of said mapped virtual block.

17. The method of claim 1, wherein said physical block within said at least one physical unit has a physical block offset, and said physical block offset may be different than said virtual block offset of said mapped virtual block.

18. The method of claim 3, further comprising the steps of:
  if said first procedure is selected and if an unwritten additional physical unit cannot be located, locating a second virtual unit corresponding to a plurality of physical units in a chain;
  locating last physical unit in said chain;
  moving data from each written physical block of each of said physical units of said chain, with the exception of said last physical unit, to a writable physical block of said last physical unit;
  updating said virtual map by mapping said virtual unit to said last physical unit, such that said virtual unit corresponds only to said last physical unit; and
  erasing all of said written physical units in said chain, with the exception of said last physical unit.

19. A memory organization method for a memory in which data can only be written to an unwritten portion of the memory, such that a written portion of the memory must be erased to become unwritten, and in which the size of the memory portion that can be erased in one operation differs from the size of the memory portion for reading or writing data, the method comprising:
  providing a plurality of physical units of the memory, each of said physical units having a size equal to an integral multiple of the smallest memory portion for erasing, each of said physical units being designated by a physical unit number and each of said physical units being divided into a plurality of physical blocks, each of said plurality of physical blocks being the size of the memory portion for reading or writing data and each of said physical blocks being designated by a physical block offset within said physical unit;
  providing a plurality of virtual units of the memory, each virtual unit being designated by a virtual unit number and each of said virtual units featuring a plurality of virtual blocks being designated by a virtual block offset within said virtual unit;
  mapping each virtual unit to at least one physical unit to form a virtual map; and
  mapping each virtual block within said virtual unit to one physical block within said at least one physical unit according to said virtual map.

20. The method of claim 19, further comprising the steps of:
  receiving a write command to write data at a virtual block;
  locating a virtual unit containing said virtual block;
  locating an unwritten block within a physical unit mapped to said virtual unit; and
  writing said data to said unwritten physical block.

21. The method of claim 20, further comprising the steps of:
  if an unwritten physical block within a physical unit mapped to said virtual unit cannot be located in a way that will result in said virtual block being mapped to said physical block, locating an unwritten additional physical unit;
  writing said data to an unwritten physical block of said additional unwritten physical unit; and
  updating said virtual map by additionally mapping said virtual unit to said additional unwritten physical unit, such that said virtual unit corresponds to said additional unwritten physical unit and to said at least one written physical unit, said additional unwritten physical unit and said at least one written physical unit forming a chain of physical units.

22. The method of claim 19, wherein said physical block within said at least one physical unit has a physical block offset, and said physical block offset is always equal to said virtual block offset of said mapped virtual block.

23. The method of claim 19, wherein said physical block within said at least one physical unit has a physical block offset, and said physical block offset may be different than said virtual block offset of said mapped virtual block.

24. The method of claim 21, further comprising the steps of:
  if an unwritten additional physical unit cannot be located, locating a second virtual unit corresponding to a plurality of physical units in a chain;
  locating last physical unit in said chain;
  moving data from each written physical block of each of said physical units of said chain, with the exception of said last physical unit, to a writable physical block of said last physical unit;
  updating said virtual map by mapping said virtual unit to said last physical unit, such that said virtual unit corresponds only to said last physical unit; and
  erasing all of said written physical units in said chain, with the exception of said last physical unit.

25. A memory organization method for a memory in which data can only be written to an unwritten portion of the memory, such that a written portion of the memory must be erased to become unwritten, and in which the size of the memory portion that can be erased in one operation is selectable from a group of sizes which contains at least one size equal to the size of the memory portion for reading or writing data and which also contains at least one size larger than the size of the memory portion for reading or writing data, the method comprising the steps of:
  providing a plurality of physical units of the memory, each of said physical units being either equal in size to one of said selectable erase sizes but not to the size of the memory portion for reading or writing or equal to an integral multiple of any of said selectable erase sizes, each of said physical units being designated by a physical unit number and each of said physical units being divided into a plurality of physical blocks, each of said plurality of physical blocks being the size of the memory portion for reading or writing data and each of said physical blocks being designated by a physical block offset within said physical unit;
  providing a plurality of virtual units of the memory, each virtual unit being designated by a virtual unit number and each of said virtual units featuring a plurality of virtual blocks being designated by a virtual block offset within said virtual unit;
  mapping each virtual unit to at least one physical unit to form a virtual map; and
  mapping each virtual block within said virtual unit to one physical block within said at least one physical unit.

26. A memory management method for a memory in which data can be written only in unwritten physical memory locations and in which a zone of contiguous memory locations can be simultaneously erased, comprising the steps of:
  organizing the memory into a plurality of units;
  organizing each unit into a plurality of blocks, each of said blocks made up of a plurality of contiguous physical memory locations;
  establishing an allocation map for each unit which indicates the status of each block in said unit as written, unwritten or deleted;
  establishing a virtual map to map virtual addresses to physical addresses;
  in writing data to said memory at a virtual address:
    mapping said virtual address to a physical address using said virtual map;
    examining said allocation map for the physical unit into which said virtual address has been mapped to determine the status of the physical block into which said virtual address has been mapped as written, unwritten or deleted;
    if said physical block is in written or deleted status, selecting one of the following two procedures:
      a first procedure, comprising:
        examining said allocation map for at least one of said units to identify an unwritten physical block;
        writing said data into said memory to said unwritten physical block;
        changing said allocation map for said unit into which said data have been written to indicate as written said previously unwritten block where said data have been written;
        changing said virtual map so that said virtual map maps said virtual address to the physical address of said previously unwritten block in which said data have been written; and
      a second procedure, comprising:
        erasing said physical block into which said virtual address has been mapped;
        writing said data into said physical block;
        if said physical block was previously marked as deleted in said unit allocation map, changing said allocation map for said unit into which said data have been written to indicate as written said previously deleted block where said data have been written.

27. The method of claim 26, wherein said first procedure is always selected.

28. The method of claim 26, wherein said second procedure is always selected.

29. The method of claim 26, wherein said selection is dependent on whether said unwritten physical block is locatable when selecting said first procedure.

30. The method of claim 26, wherein one of said first and said second procedures is selected according to an amount of said data for being written substantially simultaneously within said physical unit into which said virtual address has been mapped.

31. The method of claim 26, wherein one of said first and said second procedures is selected according to at least one of an amount of time required for erasing a physical block and an amount of time required for erasing a physical unit.

32. The method of claim 26, wherein one of said first and said second procedures is selected according to said data to be written.

33. The method of claim 26, wherein one of said first and said second procedures is selected according to a physical unit number of the unit into which said virtual address has been mapped.

34. The method of claim 26, wherein one of said first and said second procedures is selected according to said virtual address.

35. The method of claim 26, wherein one of said first and said second procedures is selected according to a random value.

36. The method of claim 26, wherein each one of said first and said second procedures is selected a fixed percentage of total selections.

37. The method of claim 26, further comprising:

allocating a counter associated with each physical block, to count erasures of said physical block with a counter; and when selecting said second procedure, incrementing said counter associated with said physical block being written.

38. The method of claim 37, wherein one of said first and said second procedures is selected according to said counter associated with said physical block into which said virtual address has been mapped.

39. The method of claim 26, further comprising:

establishing a transfer unit in said memory in which all blocks are in unwritten status, said transfer unit having an allocation map;

if said first procedure is selected and if an unwritten physical block cannot be located, locating a selected unit, other than said transfer unit, to be erased;

reading each written block in said selected unit;

writing each written block in said selected unit into said transfer unit;

updating said transfer unit allocation map to indicate a status of said written blocks as written;

erasing said selected unit; and updating said virtual map to show said new locations of said written blocks.

40. The method of claim 26, further comprising:

establishing a transfer unit in said memory in which all blocks are in unwritten status, said transfer unit having an allocation map;

periodically locating a selected unit, other than said transfer unit, to be erased;

reading each written block in said selected unit;

writing each written block in said selected unit into said transfer unit;

updating said transfer unit allocation map to indicate a status of said written blocks as written;

erasing said selected unit; and updating said virtual map to show said new locations of said written blocks.

41. The method of claim 26, further comprising:

in reading data from said memory at a virtual address:
mapping said virtual address to a physical address using said virtual map; and
reading said data from said memory at said physical address.

* * * * *